Dec. 12, 1944.  E. B. WHITEHEAD  2,364,836
BIRD CAGE
Filed Oct. 20, 1943  2 Sheets-Sheet 1

INVENTOR.
Earl B. Whitehead
BY Walter C. Ross
Attorney

Dec. 12, 1944.   E. B. WHITEHEAD   2,364,836
BIRD CAGE
Filed Oct. 20, 1943    2 Sheets-Sheet 2
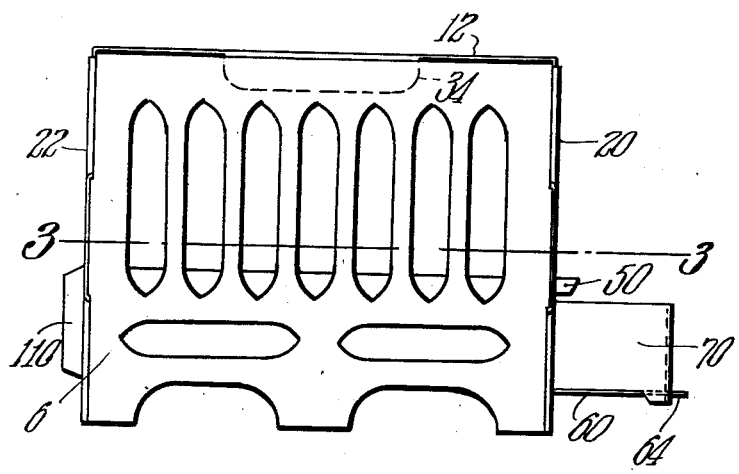
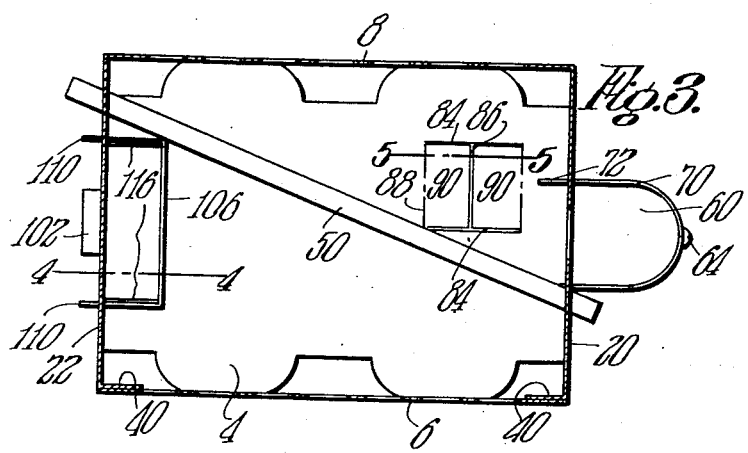
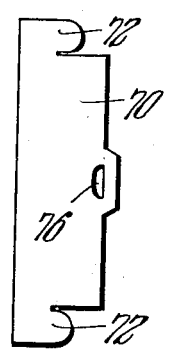
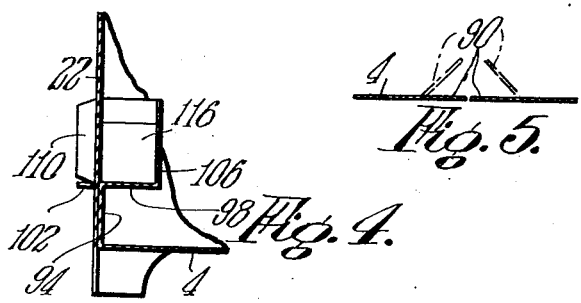
INVENTOR.
Earl B. Whitehead
BY
Attorney.

Patented Dec. 12, 1944

2,364,836

UNITED STATES PATENT OFFICE 2,364,836

BIRD CAGE

Earl B. Whitehead, Norwich, Conn., assignor to Normain Corporation, Norwich, Conn., a corporation of Delaware Application October 20, 1943, Serial No. 507,011

5 Claims. (Cl. 119—17)

This invention relates to improvements in cages for birds and the like and is directed more particularly to cages formed from sheet material.

The principal objects of the invention are directed to the provision of a novel cage for birds and the like which is formed from a sheet of preformed material.

The cage of the invention is particularly adapted for temporary use such as storing, shipping, display and other purposes, and while it is inexpensive to produce at the same time it has the desired and necessary features for the purpose intended.

In the drawings:

Fig. 2 is a front elevational view of the cage formed from the blank shown in Fig. 1;

Fig. 3 is a sectional plan view on the line 3—3 of Fig. 2;

Fig. 4 is an elevational sectional view on the line 4—4 of Fig. 3;

Fig. 5 is a sectional elevational view on the line 5—5 of Fig. 2;

Fig. 6 is a plan view of a support forming member;

Fig. 7 is an end elevational view of the support member of Fig. 6 in formed relation; and Fig. 8 is a plan view of a container-forming member of the invention.

Figure 1:
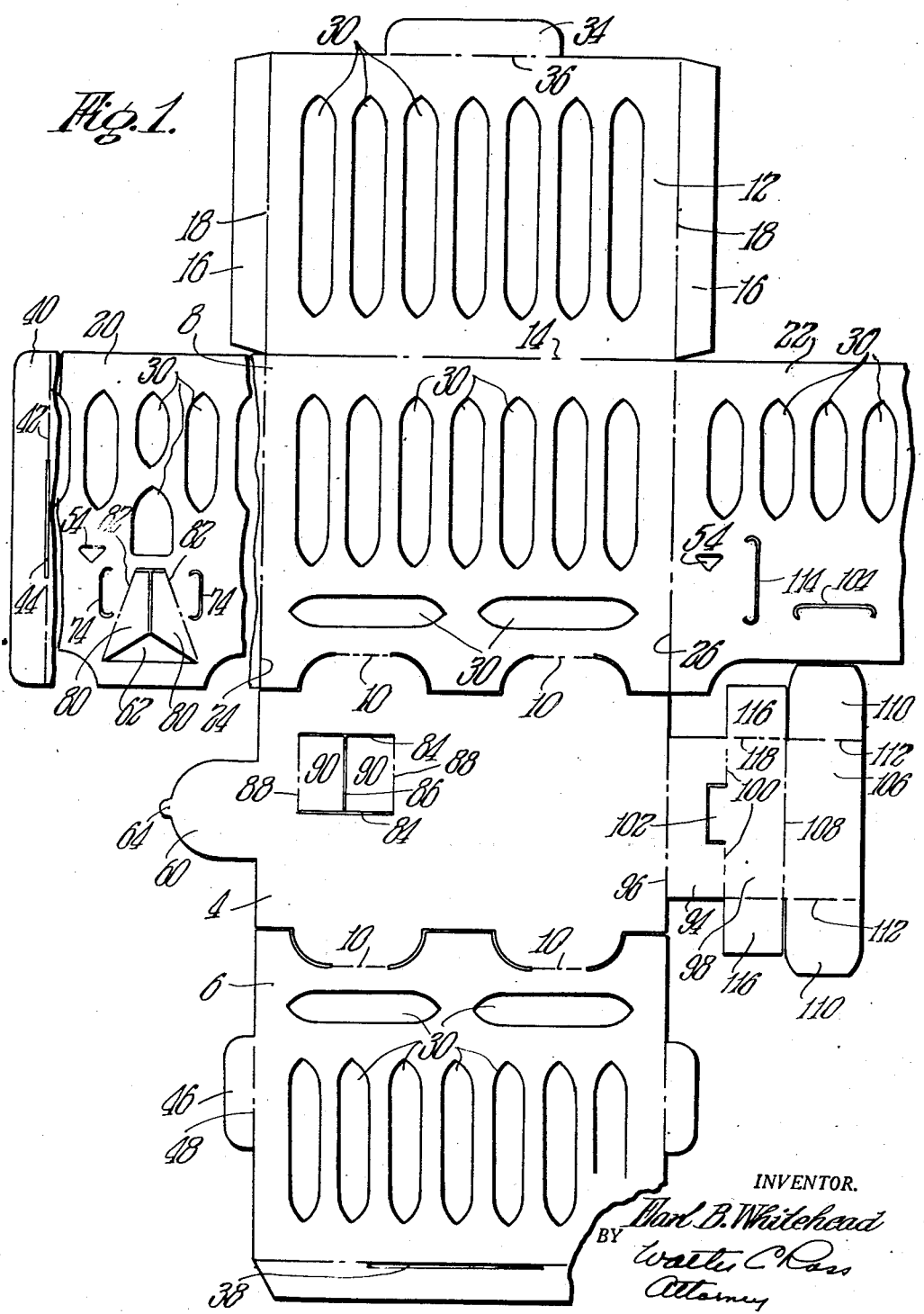
Fig. 1 is a plan view of a member formed for folding into the shape of the cage.

Referring now to the drawings more in detail, the invention will be fully described.

The blank of the invention shown in Fig. 1 has a bottom wall 4 with front and rear walls 6 and 8 hinged thereto on lines 10 for relative folding or swinging movements. A top wall 12 is hinged at 14 to the rear wall 8 and has flaps 16 hinged thereto at 18.

End walls 20 and 22 are hinged at 24 and 26 to opposite ends of the rear wall 8. The front, rear, top and end walls are provided with openings preferably elongated and represented by 30.

A tab 34 is hinged at 36 to the free edge of the top wall 12 that is receivable in a slot 38 of the front wall 6. Flaps such as 40 are hinged at 42 to the outer edges of the end walls 20 and 22 and both of said end walls are provided with slots 44 for receiving tabs such as 46 hinged at 48 to opposite sides of the front wall 6.

In setting up the blank shown in Fig. 1 it is first turned upside down so that the part 60 is at the right rather than on the left as shown in Fig. 1. The parts are manipulated as follows:

The front wall 6 and the rear wall 8 are swung upwardly relative to the bottom wall 4 so that with the bottom wall in horizontal position the front and back walls may be disposed in vertical position. The upper or top wall 12 is swung downwardly into horizontal position and the member 34 thereof inserted in slot 38.

The end walls 20 and 22 are swung inwardly to close the ends of the tube formed by the lower, front, rear and top walls. The members 46 of the front wall are inserted in the slots 44 of the end walls and thereby the wall members are releasably held in set-up relation.

The blank will preferably be cardboard or the like and to form a support for the parts in their set-up relation the following is provided:

A strip 50 preferably of cardboard or the like has longitudinal score lines 52 whereby the portions of the strip at either side of a central portion may be bent to provide a triangular shaped support as shown in Fig. 7.

The end walls 20 and 22 are provided with holes 54 for receiving the support 50 and are disposed so that the support extends through the cage diagonally as shown in Fig. 3. The support is frictionally engaged in the holes so that it functions to stiffen the cage and at the same time it serves as a bird perch.

A shelf member 60 on the lower wall is receivable in an opening 62 of end wall 20 when the parts are in set-up relation and it has a tab 64 on the outer end thereof.

A strip of flexible cardboard 70, see Fig. 8, has ears 72 for insertion in slots 74 of the end wall 20 and said strip is bendable so that it provides a housing around and above shelf 60 when the ears are inserted in the slots 74.

The tab 64 is receivable in a slot 76.

The parts just described provide a housing for a small water receptacle and doors 80 hinged at 82 are provided to facilitate access to the receptacle.

Slots 84 and 86 in the bottom wall in cooperation with bending lines 88 provide doors 90 that are swingable upwardly so that a bird may be inserted therethrough into the cage. The cage being made from cardboard as it is the doors tend to remain in relative parallel position so that when the bird has been passed through the doors they tend to close the opening.

A member 94 hinged at 96 to the end of the bottom wall is adapted to be folded up against the inside of wall 22. A part 98 hinged thereto at 100 has a tab 102 receivable in a slot 104 of end wall 22 when in horizontal position, see Fig. 4. A wall 106 hinged at 108 to part 98 has tabs 110 hinged thereto at 112 that are receivable in slots such as 114 in end wall 22 whereby the part 106 is held in vertical position. The part 98 has end tabs 116 hinged thereto at 118 and these are foldable to lie against parts 110.

The member 60 receivable in slot 62 and the member 70 connected thereto by means of the tab 64 in slot 76 with the tabs 72 in slots 74 of end wall 20 serve to secure one end of the bottom wall 4 to the said end wall 20. The parts 102 and 110 connected to the bottom wall and inserted in the slots 104 and 114 of end wall 22 serve to secure the bottom wall 4 to the other end wall 22.

The connections referred to and the support 50 function in cooperation with the parts 34 and 46 receivable in their respective slots to hold the walls in their angular relative position and reenforce the structure.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A bird cage construction formed from a sheet of cardboard having panels hinged together to provide front, bottom, rear, upper and end walls certain of which walls are provided with slits receiving parts provided on adjacent walls, certain of said walls provided with spaced openings, certain opposite walls provided with openings for a support, a support in said openings frictionally engaging the same, and separate means connecting each end of the bottom wall to an end wall, the said means at one end of the bottom wall including a member extending from the bottom wall through an opening provided in one end wall and having a tab, and a member having a slot receiving said tab and provided with end portions in slots provided in said one end wall.

2. A bird cage construction formed from a sheet of cardboard having panels hinged together to provide front, bottom, rear, upper and end walls certain of which walls are provided with slits receiving parts provided on adjacent walls, certain of said walls provided with spaced openings, certain opposite walls provided with openings for a support, a support in said openings frictionally engaging the same, and separate means connecting each end of the botom wall to an end wall, the said means at one end of the bottom wall including a member hingedly extending from the bottom wall disposed adjacent the inner face of the end wall having a tab receivable in a slot provided in the end wall and a member hingedly connected to said member having end portions receivable in spaced slots provided in said end wall.

3. A bird cage construction formed from a sheet of cardboard having panels hinged together to provide front, bottom, rear, upper and end walls certain of which walls are provided with slits receiving parts provided on adjacent walls, certain of said walls provided with spaced openings, certain opposite walls provided with openings for a support, a support in said openings frictionally engaging the same, and separate means connecting each end of the bottom wall to opposite end walls, the said means at one end of the bottom wall including a member hingedly extending from the bottom wall disposed adjacent the inner face of one end wall having a tab receivable in a slot provided in the end wall and a member hingedly connected to said member having end portions receivable in spaced slots provided in said end wall, and the said means at the other end of the bottom wall including a member extending from the bottom wall through an opening provided in the other end wall and having a tab, and a member having a slot receiving said tab and provided with end portions in slots provided in said other end wall.

4. A bird cage construction formed from a sheet of cardboard having panels hinged together to provide front, bottom, rear, upper and end walls with certain of said walls provided with slits receiving parts provided on adjacent walls, said end walls provided with spaced openings, certain opposite walls provided with openings for a support, and separate means connecting each end of the bottom wall to an end wall, the said means at one end of the bottom wall including a member hingedly extending from the bottom wall disposed adjacent the inner face of the end wall having a tab receivable in a slot provided in the end wall and a member hingedly connected to said member having end portions receivable in spaced slots provided in said end wall, and a support extending between said end walls disposed angularly relatively to said end and said front and rear walls having opposite ends frictionally receivable in openings provided in said end walls.

5. A bird cage construction formed from a sheet of cardboard having panels hinged together to provide front, bottom, rear, upper and end walls certain of which walls are provided with slits receiving parts provided on adjacent walls, certain of said walls provided with spaced openings, and separate means connecting each end of the bottom wall to an end wall, the said means at one end of the bottom wall including a member hingedly extending from the bottom wall disposed adjacent the inner face of the end wall having a tab receivable in a slot provided in the end wall and a member hingedly connected to said member having end portions receivable in spaced slots provided in said end wall, said end walls provided with three sided openings, and a support scored longitudinally providing three longitudinal sections relatively angularly disposed with opposite ends of said support in said openings whereby the sides of the openings frictionally engage the sections of said support.

EARL B. WHITEHEAD.